F. RIEBER.
APPARATUS FOR DETERMINING THE DIRECTION OF A SOURCE OF SOUND.
APPLICATION FILED MAY 7, 1918.
1,299,616.
Patented Apr. 8, 1919.
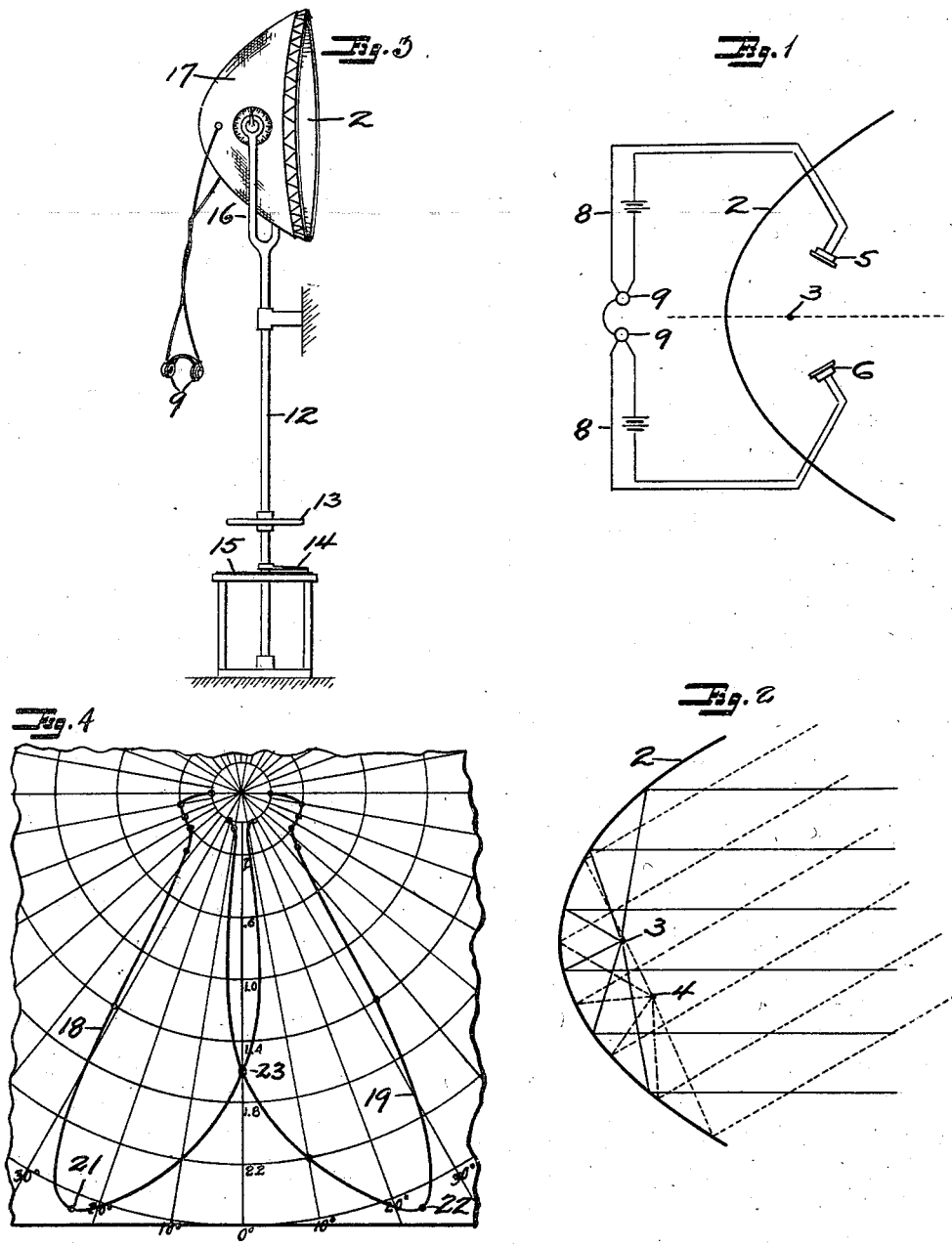
WITNESS
J. B. Gardner
INVENTOR.
FRANK RIEBER
BY White & Prost
ATTORNEYS

UNITED STATES PATENT OFFICE.

FRANK RIEBER, OF SAN FRANCISCO, CALIFORNIA, ASSIGNOR TO RIEBER LABORATORIES, OF SAN FRANCISCO, CALIFORNIA, A CORPORATION OF CALIFORNIA.

APPARATUS FOR DETERMINING THE DIRECTION OF A SOURCE OF SOUND.

1,299,616.      Specification of Letters Patent.      Patented Apr. 8, 1919.

Application filed May 7, 1918. Serial No. 233,095.

*To all whom it may concern:*

Be it known that I, FRANK RIEBER, a citizen of the United States, and a resident of the city and county of San Francisco and State of California, have invented a certain new and useful Apparatus for Determining the direction of a Source of Sound, of which the following is a specification.

The invention relates to an apparatus for determining the direction of a source of sound.

An object of the invention is to provide an apparatus for determining with accuracy the direction of location of a source of observed sound.

Another object of the invention is to provide means for concentrating the received sound waves, to produce better reception of faint or distant sounds than is ordinarily possible.

The invention possesses other advantageous features, some of which, with the foregoing, will be set forth at length in the following description where I shall outline in full, that form of the invention which I have selected for illustration in the drawings accompanying and forming part of the present specification. In said drawings I have shown one form of the apparatus of my invention, but it is to be understood that I do not limit myself to such form, since the invention, as expressed in the claims, may be embodied in a plurality of forms.

Referring to said drawings:

Figure 1 is a diagrammatic representation of the apparatus of my invention.

Fig. 2 is a diagrammatic representation showing the reflection of received sound waves.

Fig. 3 is an elevation of one form of apparatus of my invention.

Fig. 4 is a polar coördinate curve showing the intensity of the received signals.

The human ear and the accompanying nervous system is capable of locating the direction of a source of sound with moderate accuracy, and this is believed to be due either to a difference in phase of excitation of the two ear drums or to a difference in intensity of excitation of the two ear drums. This phenomenon is made use of in the apparatus of my invention to determine with accuracy the direction of a source of sound. In accordance with my invention I concentrate the received sound by bringing the sound waves to a focus and provide means for varying the position of the focus with relation to two sound translating or receiving devices which are connected independently to the ears of the observer. By shifting the position of the focus, the relative intensity of sound conveyed to each ear varies, and by adjusting the apparatus so that the sound intensities in both ears is the same, the direction of the source of the sound is determined with accuracy. The apparatus is particularly useful to navigation in thick or foggy weather and is useful in determining the location of distant sounds, such as the exhaust of aircraft engines.

The apparatus consists of a reflector 2, preferably a parabolic reflector which is adapted to receive a sound beam and concentrate the resultant vibrations to a focus, when the axis of the reflector points directly to the source of sound, the focus 3 of the concentrated beam will lie in the axis of the reflector, at its normal focal point. When the sound waves arrive along a path which is oblique to the axis of the reflector, the focal point 4 of these waves is displaced from the central focal point, in a direction opposite to the inclination of the path. In practice, the sound waves are not concentrated at a sharp point, on account of the diffusion of sounds leaving the reflecting surface and the focus of the beam occupies a moderately large space within the reflector, and in this space the sound waves are concentrated to a far greater intensity than elsewhere within the reflector.

Arranged within the reflector on opposite sides of the central focal point and spaced therefrom are two sound receiving or translating devices 5—6 which may be microphonic transmitters of the standard telephone type or resonance tubes or any other sound collecting device. In the drawing I have shown microphones, but the resonators may be used with perhaps equal efficiency and in some instances with better efficiency, since they are adjustable to respond to the exact frequency of the sound to be located. Connected to each microphone is a circuit containing a battery 8 or other source of energy and a receiver 9. In operation the receivers are fitted to the ears of the operator, so that he can readily detect the presence and intensity of sound received.

The reflector 2 is mounted on a vertical shaft 12, so that it may be readily rotated to cause a movement of the focal point of the sound beam with respect to the axis of the reflector, and a hand wheel 13 is provided for rotating the shaft. Secured to the shaft is a pointer 14 which is movable over the stationary dial 15, so that the direction of the source of sound will be determined when the axis of the reflector has been brought into the path of the sound. When used for determining the position of air-craft, the reflector is also movable about a horizontal axis, formed by the fork 16 secured to the shaft and similar means are provided for determining the vertical inclination of the axis of the reflector. The exterior surface of the reflector is preferably covered with a backing 17 of canvas or other sound deadening material, so that extraneous sounds or sound reflections will not interfere with the operation of the apparatus.

In operation, the operator rotates the reflector, thereby shifting the focal point of the received sound beam, until there is an equal intensity of sound in each ear. When the focal point of the beam coincides with the central focus of the reflector, the excitation of the sound receiving devices 5—6 becomes far greater in intensity and the sound is heard with accentuated loudness in both ear pieces simultaneously. In Fig. 4, I have shown polar coördinate curves, showing the intensity of the sound in the two microphones for different positions of the focal point of the sound beam with relation to the microphones. Curve 18 shows the intensities of received sound in microphone 5, as the sound focal point is moved, and curve 19 shows the intensities of received sound in microphone 6. The greatest intensity of sound in microphone 5 occurs when the focal point of the sound beam coincides with the microphone 5, and is indicated at point 21 on curve 18. with the reflector in such position, the intensity of sound in the other microphone is practically zero. Similarly point 22 on curve 19 indicates the intensity of sound in microphone 6, when the focal point of the sound beam falls on microphone 6. At the point 23, where the curves cross, the intensity of sound is equal in both microphones and this occurs when the focal point of the beam coincides with the central focus of the reflector. At the point of intersection 23 the curves are steep, so that a slight angular variation in position of the reflector, produces a great difference in the sound intensities in the two microphones, thereby enabling the operator to bring the two focal points into coincidence with great accuracy.

I claim:

1. An apparatus for determining the direction of a source of sound comprising a reflector having a focus and sound receiving devices arranged on opposite sides of said focus.

2. An apparatus for determining the direction of a source of sound comprising a reflector having a focus and sound receiving devices arranged within the reflector and located symmetrically with respect to the axis of the reflector.

3. An apparatus for determining the direction of a source of sound comprising a reflector having a focus, sound receiving devices arranged within the reflector and located symmetrically with respect to the axis of the reflector, ear pieces and means independently connecting each sound receiving device with an ear piece.

4. An apparatus for determining the direction of a source of sound comprising a parabolic reflector, and sound receiving devices arranged within the reflector and located symmetrically with respect to the axis of the reflector.

5. An apparatus for determining the direction of a source of sound comprising a parabolic reflector, sound receiving devices arranged within the reflector and spaced from and located symmetrically with respect to the axis of the reflector and means for rotating the reflector about a vertical axis.

6. An apparatus for determining the direction of a source of sound comprising a parabolic reflector, sound receiving devices arranged within the reflector and spaced from and located symmetrically with respect to the axis of the reflector, ear pieces, and means independently connecting each sound receiving device with an ear piece whereby the sound received in each device is independently conveyed to the ear.

7. An apparatus for determining the direction of a source of sound comprising a reflector adapted to concentrate a beam of sound to a focal point, sound receiving devices arranged within the reflector and spaced from and located symmetrically with respect to the axis of the reflector and a covering of sound deadening material over the outer surface of the reflector.

8. An apparatus for determining the direction of a source of sound comprising means for concentrating a sound beam to a small area, two spaced sound receiving devices arranged adjacent said area and means for moving the area with respect to said devices so that the intensity of sound in the two devices is equal.

9. The method of determining the direction of a source of sound which consists in concentrating a beam of sound to a focus and shifting said focus with relation to sound receiving devices having definite positions until the intensity of the sound at the two devices is equal.

In testimony whereof I have hereunto set my hand at San Francisco, California, this 26th day of April, 1918.

FRANK RIEBER.

In presence of—
  H. G. PROST.